UNITED STATES PATENT OFFICE 1,975,397

PROCESS FOR THE MANUFACTURE OF CHANGEANT OR OPALESCENT GLASS

Norbert Kreidl, Reitendorf-on-the-Tess, Czechoslovakia, assignor to the firm Glashuttenwerke vorm. J. Schreiber & Neffen, Reitendorf-on-the-Tess, Czechoslovakia No Drawing. Application July 10, 1930, Serial No. 467,137. In Czechoslovakia July 18, 1929

6 Claims. (Cl. 49—82)

This invention relates to a process for the manufacture of changeant or opalescent glass.

In the manufacture of so-called changeant or opalescent glass, use has hitherto been made, exclusively, of the oxides of uranium, neodymium and praseodymium, which produce fluorescent effects in glass, in which they are apparently dichroic. No other substances possessing dichroic properties in glass have hitherto been discovered, and the manufacture of such changeant or opalescent glasses has therefore been restricted, up to the present, to certain definite colors.

The present invention aims at rendering the manufacture of changeant or opalescent glass of non-planar surface such as hollow glassware, table glassware, solid glassware and the like, possible with ordinary colors. The process consists in flashing or covering a colored glass with at least one differently colored glass, but combining together only such colors that:

(1) The outer colored layer does not absorb, or only partially absorbs light rays which are transmitted by the inner layer; and (2) That the inner colored layer absorbs light rays which the outer one does not absorb.

The invention at the same time utilizes the circumstance that the color of ordinary colored glasses is often a combination of different colors. Thus, for example, a selenium-red glass can be flashed or covered with a copper-blue layer of glass, which is transparent to the red color of the inner layer, whereas the inner layer is opaque to the blue.

The changeant or opalescent effect can be influenced by suitably selecting the thickness of the superimposed flashed glasses or layers of glass, for example by forming layers of different thicknesses and by suitably varying the depth of tone of the superimposed layers.

The transparency and opacity of one color in relation to another color is a known property, so that, on the basis of the hereinbefore mentioned rule, the selection of suitable colors becomes self evident.

A suitable method of carrying out the invention consists in superimposing the flashed layers of glass so that they lie in the form of oppositely directed wedges, or merge one into the other and the thickness of the superimposed layers varies in each cross section, or differs at various places, a convex or concave line of demarcation being preferable.

By the provision of reflecting surfaces on the surface of the glass, for example by forming depressions, ribs and the like, the changeant or opalescent effect can be still further intensified. In this manner different color effects are obtained on viewing the surface at different angles.

Accordingly, such glasses, formed of two or more layers—in which latter case, layers of plain glass can also be employed—enable a great variety of changeant or opalescent effects to be obtained.

What I claim is:

1. A changeant or opalescent glass comprising a plurality of superposed layers of colored glass united together, the colors of the glass layers being such that at least one of the layers is at least partly transparent to light rays transmitted by another layer, and wherein the surface of at least one of the glass layers is formed with such a variegated geometric configuration that it offers different conditions for the refraction and/or reflection of light rays going through it at different places.

2. A changeant or opalescent glass comprising a variety of superposed layers of glass united together, at least two layers of which are differently colored and of wedge-shape form, with said layers so disposed that the wedges are oppositely directed whereby the superposed layers will be of different thickness at different points, the colors of the layers being such that at least one layer is wholly or partially transparent to light rays transmitted by another layer.

3. A changeant or opalescent glass comprising a plurality of superposed layers of colored glass united together, the colors of the glass layers being such that at least one layer is wholly or partially transparent to light rays transmitted by another layer and wherein the surfaces of the composite layer are formed with depressions, ribs or the like.

4. A changeant glass in which the changeant effect is produced by uniting a layer of selenium-red glass with a layer of copper-blue glass, at least one of said layers having a variegated geometric configuration so as to offer different conditions for the refraction and/or reflection of light rays going through it at different places.

5. The process of manufacturing changeant glass in which the changeant effect is produced by superimposing at least two different colored glass layers of such color that the outer layer is at least partly transparent to light rays transmitted by the inner layer and shaping the surfaces of at least one of the glass layers with such a variegated geometric configuration that it offers different conditions for the refraction and/or reflection of light rays going through it at different places.

6. The process of manufacturing changeant glass in which the changeant effect is produced by superimposing at least two differently colored glass layers of such colors that at least one of the layers is at least partly transparent to light rays transmitted by another layer, and shaping the surface of at least one of the glass layers with such a variegated geometric configuration that it offers different conditions for the refraction and/or reflection of light rays going through it at different places.

NORBERT KREIDL.